(12) United States Patent
Brackett et al.

(10) Patent No.: US 7,034,420 B2
(45) Date of Patent: Apr. 25, 2006

(54) CRASH MANAGEMENT SYSTEM FOR IMPLEMENTATION IN FLYWHEEL SYSTEMS

(75) Inventors: Norman C. Brackett, North Reading, MA (US); James G. Crowley, Marblehead, MA (US); Richard L. Hockney, Lynnfield, MA (US); Matthew L. Lazarewicz, Boxford, MA (US); Eric A. Lewis, Newton, MA (US)

(73) Assignee: Beacon Power Corporation, Wilmington, MA (US)

( * ) Notice: Subject to any disclaimer, the term of this patent is extended or adjusted under 35 U.S.C. 154(b) by 0 days.

(21) Appl. No.: 10/242,830

(22) Filed: Sep. 13, 2002

(65) Prior Publication Data

US 2003/0061898 A1    Apr. 3, 2003

Related U.S. Application Data

(60) Provisional application No. 60/322,062, filed on Sep. 13, 2001.

(51) Int. Cl.
*H02K 7/02* (2006.01)

(52) U.S. Cl. .................... 310/74; 74/572.1; 74/572.2
(58) Field of Classification Search ............... 310/74, 310/68 B; 74/572, 572.1–572.2, 574.3; 318/161, 318/107, 717
See application file for complete search history.

(56) References Cited

U.S. PATENT DOCUMENTS

| 3,662,619 | A | * | 5/1972 | Seeliger ................ 74/572 |
| 4,111,067 | A | * | 9/1978 | Hodson ................. 74/572 |
| 4,660,435 | A | * | 4/1987 | Davis et al. ............ 74/572 |
| 4,819,502 | A | * | 4/1989 | Nakajima et al. ....... 74/572 |
| 5,065,060 | A | * | 11/1991 | Takahashi et al. ...... 310/74 |
| 5,614,777 | A | * | 3/1997 | Bitterly et al. ........ 310/74 |
| 5,692,414 | A | | 12/1997 | Gregoire ............... 74/572 |
| 5,760,508 | A | * | 6/1998 | Jennings et al. ....... 310/74 |
| 5,912,519 | A | | 6/1999 | Horner et al. .......... 310/74 |
| 6,150,742 | A | | 11/2000 | Horner et al. .......... 310/74 |

FOREIGN PATENT DOCUMENTS

| EP | 0 821 462 A2 | 1/1998 |
| EP | 0 821 463 A2 | 1/1998 |
| EP | 0 821 464 A2 | 1/1998 |
| EP | 0 775 382 B1 | 3/1999 |
| EP | 0 821 464 B1 | 1/2002 |
| EP | 0 821 463 B1 | 3/2002 |
| EP | 0 821 462 B1 | 5/2002 |
| JP | 62-103479 | * 5/1987 |
| JP | 62-103482 | * 5/1987 |
| WO | WO 9605646 A2 | 2/1996 |

* cited by examiner

*Primary Examiner*—Karl Tamai
(74) *Attorney, Agent, or Firm*—Edwards & Angell, LLP; David G. Conlin

(57) ABSTRACT

A crash management system for implementation in a flywheel energy storage system (FESS) is provided. Implementation of such a system entails designing an FESS rim that is highly failure resistant, and designing the FESS such that if one, some, or even all of its components fail, they are physically prevented from accumulating and releasing enough energy to cause rim burst, thus leaving the rim intact and capable of safely remaining spinning even after one or more FESS component failures have occurred.

32 Claims, 6 Drawing Sheets

CRASH MANAGEMENT SYSTEM FOR IMPLEMENTATION IN FLYWHEEL SYSTEMS

This application claims the benefit of Provisional Application No. 60/322,062, filed Sep. 13, 2001.

FIELD OF THE INVENTION

The present invention relates generally to systems for safely managing crashes or failures of industrial equipment and/or its components. More particularly, the present invention relates to systems that allow for effective management of crashes or failures of flywheel energy storage systems in operational and/or testing settings, wherein such systems represent a radical departure from conventional systems, which seek to entirely avoid the occurrence of flywheel failures or crashes, and which, in so doing, do not allow for flywheel energy storage systems to be as optimally operated as compared to systems of the present invention.

BACKGROUND OF THE INVENTION

Flywheel energy storage systems ("FESS") have been known in the art for a number of years, and have proven to be extremely useful for generating, storing and recovering kinetic energy. A conventional flywheel system 10 is depicted in FIGS. 1, 1A and 1B, and includes a flywheel assembly that is disposed within a flywheel housing 14.

A typical flywheel assembly includes a rim 16, a hub 18 that secures the rim to a shaft 20, as well as one or more bearing assemblies 22 (e.g., one or more top bearings 22A and bottom bearings 22B) that rotatably support the shaft. The rim 16 can also be designed to provide structural support to the inner hub 18, in the event that the latter fractures.

In these figures, the radial and axial directions (with respect to a long axis of the shaft 20) are denoted, respectively, by lines C—C and D—D.

In operation, a motor 24 drives the shaft 20, which, in turn, drives a flywheel 26 at a high velocity, thus transforming a significant amount of electrical energy into kinetic energy (which is proportionally related to the mass, and the square of the velocity of the rotor) that is stored within the flywheel assembly. Once the flywheel 26 has attained a desired rotational velocity, the motor 24 is thereafter powered as needed to maintain the rotational velocity of the flywheel within a predetermined range.

Flywheel energy storage systems 10 have found use in numerous environments including, but not limited to short term energy storage and load leveling or smoothing applications. Their use as stand-alone supplemental, auxiliary, or emergency energy sources (i.e., uninterruptible power supplies), however, is particularly preferred.

This is because the design of the flywheel assembly ensures that when the motor 24 shuts down (e.g., due to a power outage), the stored kinetic energy in the assembly will enable a flywheel rotor 28 to continue to rotate for an extended period of time. Rotation of the rotor 28 following cessation of power to the flywheel 26 allows the flywheel to produce/generate power by induction (i.e., electrical power) through the motor 24, which is set in so-called "generator mode" upon sensing input power loss, and which, therefore, can provide short-term, auxiliary or emergency power until power is restored or supplied by other means. The motor 24, when set in the "generator mode," also can be used to slow down the rotor 28, e.g., for rotor maintenance or in response to a sensed abnormal condition.

Among the most significant concerns with respect to flywheel systems 10 is their behavior in the event of a failure (i.e., "crash"), which generally occurs either when the rim itself fails (thus leaving no barrier for other flywheel parts) due to the flywheel entering an over-speed condition, due to exceeding of low cycle fatigue capability, and/or due to the accumulation of imbalanced stresses, or when one or more of the flywheel parts fails and causes damage to the rim 16 and/or penetrates or otherwise damages the housing 14. In the case of such failure, the motor 24 also typically is not available to slow down the rotor.

Because of the high speeds of flywheel motors 24 and rotors 28, and the amount of kinetic energy that flywheel assemblies 26 store, any failure or crash of the flywheel system has the potential to cause the flywheel assembly to violently break apart, with various sized pieces being scattered at high velocities into the flywheel housing 14, which, if it breaks, could allow the scattered pieces to cause further damage to other persons and/or property.

Fortunately, flywheel systems 10 that are used as uninterruptible power supplies can be sited and operated below grade (i.e., underground). This all but ensures that if any conceivable structural failure of the system 10 occurs, such a failure would likely be entirely contained below ground. Unfortunately, despite these advantages, below-ground siting of flywheel systems 10 is not without problems. For example, such placement hampers/complicates the ability to recognize that a flywheel component has failed, and severely limits the ability to inspect the system 10 for any visual evidence indicating, and/or predicting the onset of failure of one or more of the components of the system.

Generally, equipment that undergoes operational stresses similar to those of flywheel systems 10 is primarily tested for evidence or indicators of failure via visual-based inspections. For example, safety personnel inspect (either with the naked eye, or through the use of visual enhancement devices/techniques) such equipment at predetermined intervals to determine whether cracks have formed on any of the equipment parts, and/or whether some parts appear to be susceptible to crack formation in the future.

In many cases, the safety critical components of the equipment have (or are perceived to have) a longer life than the usuable life of the equipment as a whole, and, consequently, are inspected often only during the manufacturing process. This approach is used for flywheel systems 10 that are sited belowground, where visual inspection during the lifetime of the system is highly impractical to the point of being impossible. Simply put, it would take far too much time and effort to excavate a flywheel system 10, to thoroughly examine it, and then to properly place it back in its belowground location. Expenditure of such time and effort, even in the name of safety, is too costly to operators and too disruptive to operation of the flywheel system 10.

Realizing this, most in the art have attempted to ensure/validate the safety of flywheel systems 10 instead through modeling/experimentation. In accordance with such efforts, flywheel systems 10 are caused to catastrophically fail in simulated usage environments, and are retrieved and painstakingly forensically examined to determine any relevant information regarding the extent of damage caused as a result of their crash (e.g., which parts failed, in what order, at what time, and for what reasons). This information is then compared and contrasted with previous results to estimate acceptably safe system operation ranges.

Unfortunately, this type of safety modeling/experimentation is replete with problems and disadvantages, mostly owing to the fact that, at best, it amounts to educated guesswork. For even after several catastrophic failures are induced, each of which takes considerable time, money and manpower to set up, execute and forensically analyze, the initial suppositions about the specifics of these induced flywheel failures/crashes, may or may not be entirely correct. Only by performing numerous controlled experiments (i.e., akin to Design of Experiments (DOE), Taguchi et al.) and/or advanced structural analysis and failure techniques could one confirm these failure suppositions. Doing so, however, would amount to the expenditure of even more time, money and effort.

Because of this, operators seemingly have been left with little choice but to operate flywheel systems 10 in sub-optimal manners in hopes of decreasing the likelihood of the occurrence of catastrophic failures/crashes. For example, in the name of safety, flywheels systems 10 are usually operated at speeds well below their ideal (let alone maximum) operating speeds and, as such, produce less kinetic energy than is ideal, and much less than is possible to produce.

In essence, conventional flywheel systems 10 are currently being operated in a manner whereby they definitely store less kinetic energy than is ideal/desirable, in an effort to potentially decrease the likelihood of a catastrophic failure, which may or may not have occurred had the flywheel system been operated at its ideal capacity. Therefore, a need exists for a flywheel system that can operate at levels that more closely approach optimal operation levels, while not unacceptably compromising the overall safety and operability of the flywheel system.

SUMMARY OF THE INVENTION

The present invention meets this, and other needs by providing systems for managing failures/crashes that may occur in flywheel assemblies. Such systems represent a radical change in flywheel design/operation philosophy, which heretofore consisted of designing and operating flywheels in a conservative manner in order to prevent or at least drastically minimize the occurrence of flywheel crashes/failures.

As indicated above, the conservative conventional approach, while perhaps effective to prevent some flywheel crashes that may or may not ultimately occur, almost certainly results in flywheel operation at sub-optimal levels (e.g., at sub-optimal speeds). That, in turn, results in flywheel energy storage systems that do not store as much kinetic energy as is ideal, let alone as is possible.

In accordance with systems of the present invention, flywheels are designed such that they are failure resistant, but also such that in the unlikely event that a failure of one or more of the components of the flywheel does occur, the design of the flywheel system allows the failure(s) to be managed effectively—that is, without the entire flywheel breaking apart into pieces. And in accordance with further aspects of the present invention, the flywheels of such systems also are designed so as to be resistant to such catastrophic failure.

Implementation of such systems entails designing a flywheel with a highly failure resistant rim, and/or designing the flywheel such that if one, some, or even all of its components (e.g., hub, shaft) fail or become loosened, the components are impeded from releasing energy rapidly enough to cause rim failure, thus leaving the rim intact and able to remain spinning for an extended period of time.

In an exemplary aspect of the present invention, a flywheel system of the present invention is able to manage crashes/failures because it is specifically designed to include at least one physical/structural barrier (e.g., a plate) strategically placed within the FESS system such that if one or more components of the flywheel assembly loosens or fails, the component(s) is/are physically prevented or substantially hindered from releasing energy rapidly enough to threaten the structural integrity of the rim (i.e. from causing rim burst) and/or flywheel housing and, thus, the structural integrity of the flywheel assembly.

In other words, at least one a structural barrier is disposed within a flywheel system on a flywheel assembly, wherein the structural barrier is configured and positioned within the flywheel system such that that, following failure of at least one component of the flywheel system, motion of a flywheel of the flywheel assembly is restricted to less than a predetermined value in at least one of an axial direction or a radial direction with respect to a long axis of a shaft to which the flywheel is mounted.

The specific shape of each barrier may vary; however, the shape should be chosen so as to ensure (or to at least increase the likelihood) that any components of the system that impact the plate(s) will rub against but not adhere to (i.e., not grab onto) the periphery of the plate(s). The rubbing action is effective to reduce the energy or velocity of a loosened/failed component, which, if it instead adhered to the plate(s), could cause an upset condition that would expedite a failure or crash of the system 110.

In an exemplary aspect of the present invention, each plate/barrier is shaped to be or to resemble a cylindrical member.

Flywheel systems in accordance with the present invention are as safe, if not safer than conventional systems. They simply ensure their high level of safety through a different design/operation philosophy, which also beneficially allows flywheels of the present invention to be more productive as compared to known flywheel systems.

This added productivity is a direct result of the design of flywheel systems of the present invention, wherein this design not only ensures that the flywheel rim will not fail, but that failed hub and/or shaft components will not penetrate through the rim before the failure of such components can be detected, and before the flywheel system can be safely halted without incident. These assurances allow the flywheel systems of the present invention to be confidently operated at higher speeds without fear of adverse consequences, and, therefore, to generate and store more energy as compared to conventional flywheels, which, due to their design philosophy, must be operated in a sub-optimal, conservative manner to assuredly guard against possible failures.

In accordance with an exemplary aspect of the present invention, the flywheel system includes a rim that is specifically designed to withstand the full centrifugal dead load of the hub and shaft, even if the rim carries/bears the full inertial load of the hub and the shaft (i.e., even if neither the hub nor the shaft carries/bears such load).

In an exemplary aspect of the present invention, the rim is kept intact and enabled to keep spinning following a failure because it is highly failure resistant and itself remains intact both during and following a failure of one, some, or all of the remainder of the parts (e.g., shaft, hub) of the flywheel assembly.

Because the rim remains intact, it can remain spinning, all-the-while encasing a failed hub, or guiding the rotation of a failed shaft of the flywheel assembly, and preventing these and other flywheel components from being ejected from the assembly.

This philosophy of the present invention represents a complete departure from conventional flywheel rim design philosophy, which may not be able to contain a failed hub or be able to guide a rotor having a failed shaft.

In accordance with an related aspect of the present invention, the flywheel rim is failure/burst resistant because it is a multi-layered rim that is made from a composite that comprises a plurality of layers of co-mingled fibers, wherein some or all of the layers have different strengths and stiffnesses. Although all of the rim's fiber layers are strong (and, therefore, resistant to crack formation), the strongest fiber layers generally are located at the outer diameter of the rim, thereby inhibiting the propagation of cracks that may form in inner layers of the rim and attempt to outwardly propagate.

In another related aspect of the invention, the flywheel system can optionally include sensors that can sense conditions (e.g., high vibration levels) that, if continued for a prolonged period of time, would compromise the structural integrity of the rim, if not the entire FESS. Upon sensing these conditions, power to the flywheel is discontinued, thus causing the flywheel to gradually decelerate, and to eventually halt without incident.

Other aspects and embodiments of the present invention are discussed in detail below.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views, and wherein.

DETAILED DESCRIPTION OF THE INVENTION

Figure 2:
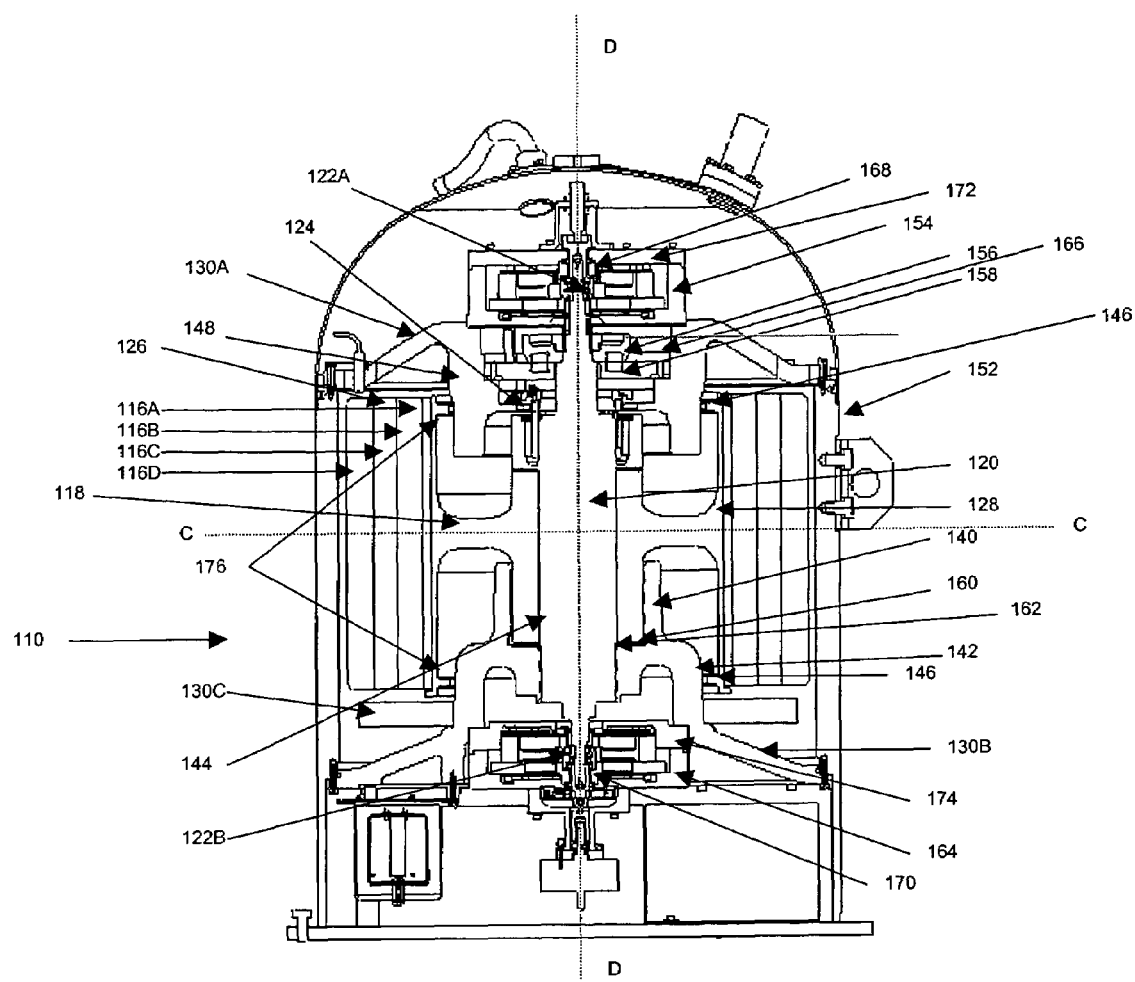
FIG. 2 is a schematic cut away view of a flywheel evacuated energy storage system in accordance with the present invention.
Figure 2A:
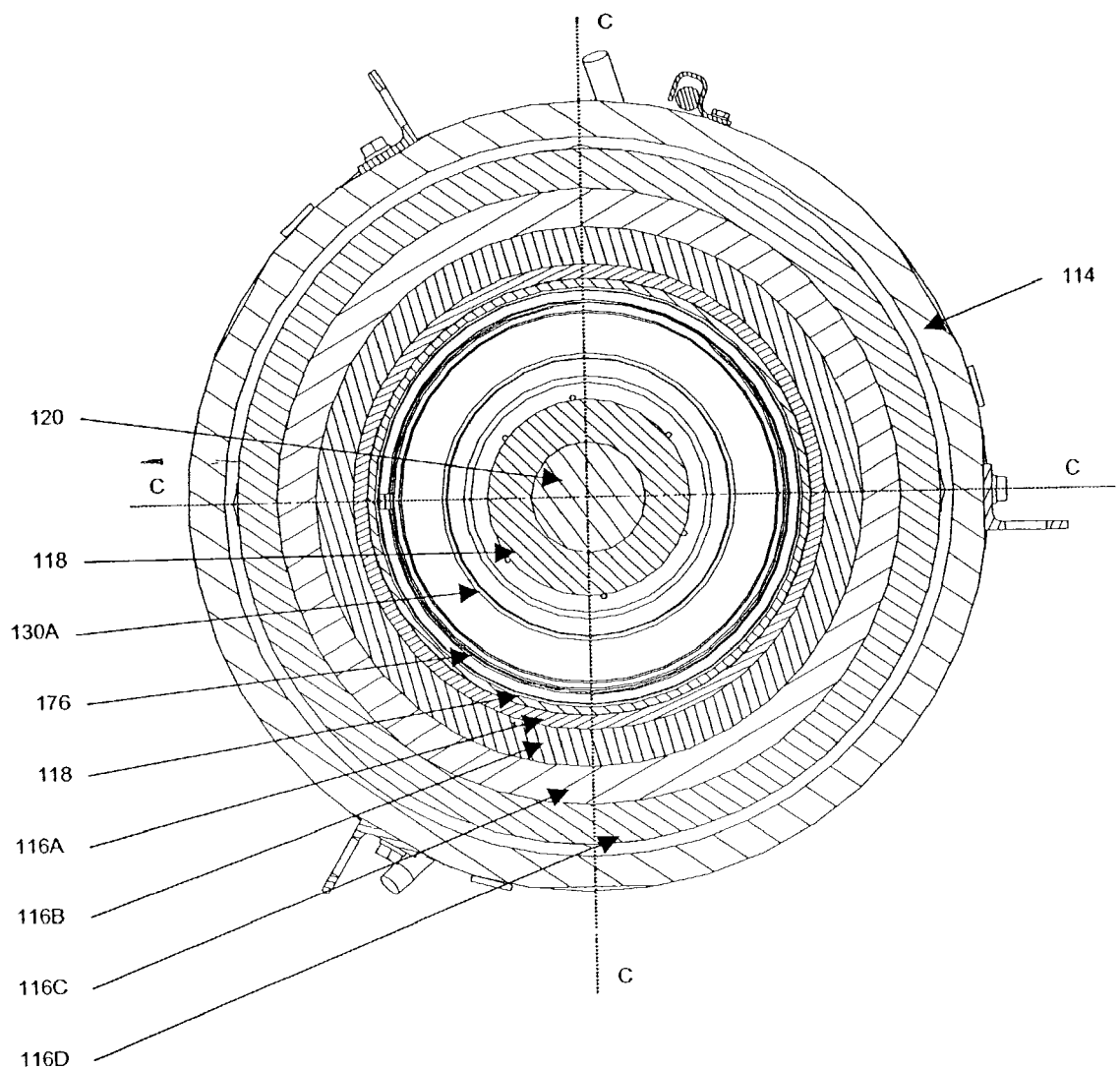
FIG. 2A is a cross sectional view of the FESS of FIG. 2 along the line A—A.
Figure 2B:
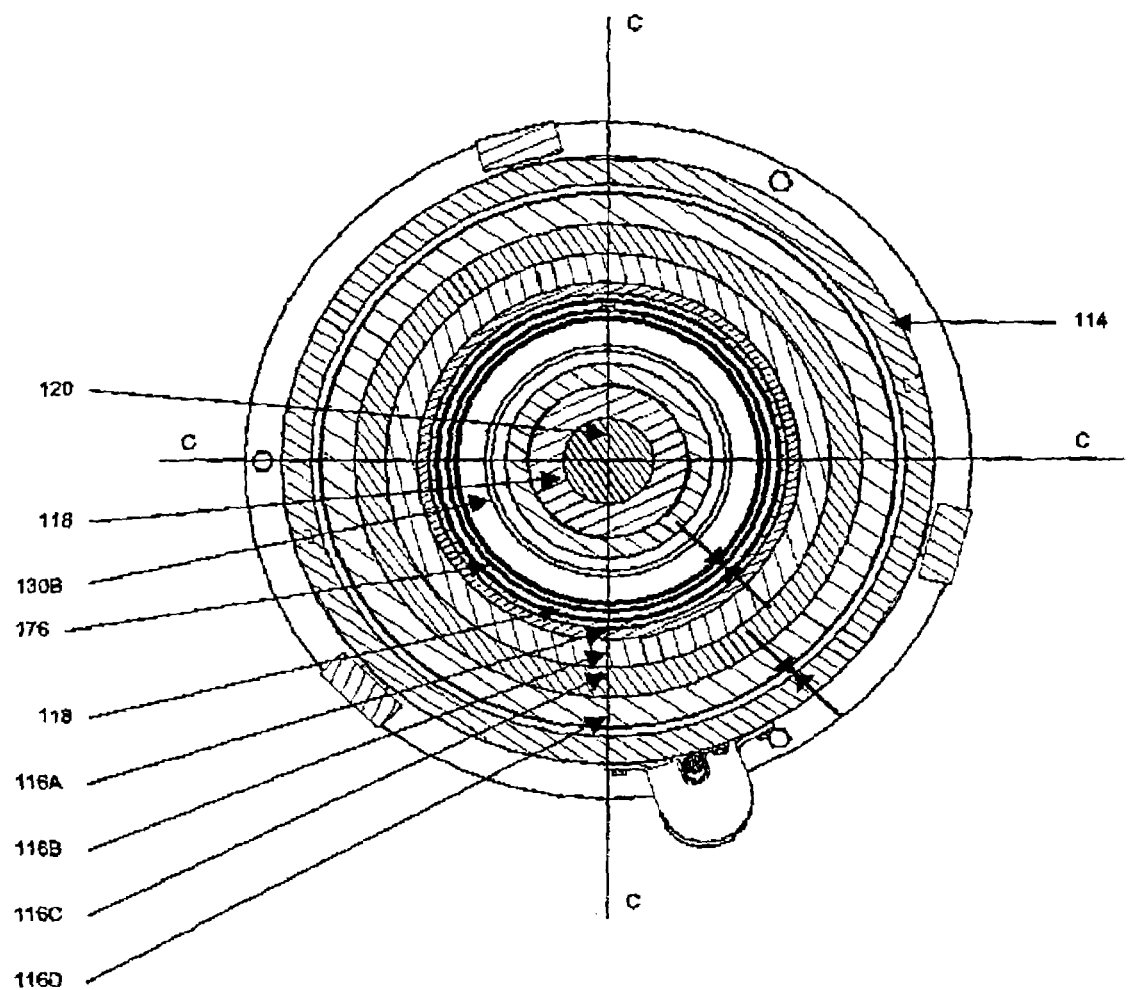
FIG. 2B is a cross sectional view of the FESS of FIG. 2 along the line B—B.

FIGS. 2, 2A and 2B depict an exemplary flywheel energy storage system 110 ("FESS") designed in accordance with the crash/failure management system of the present invention. In these figures, the radial and axial directions (with respect to a long axis of a shaft 120 of the flywheel assembly) are denoted, respectively, by lines C—C and D—D.

Figure 1:
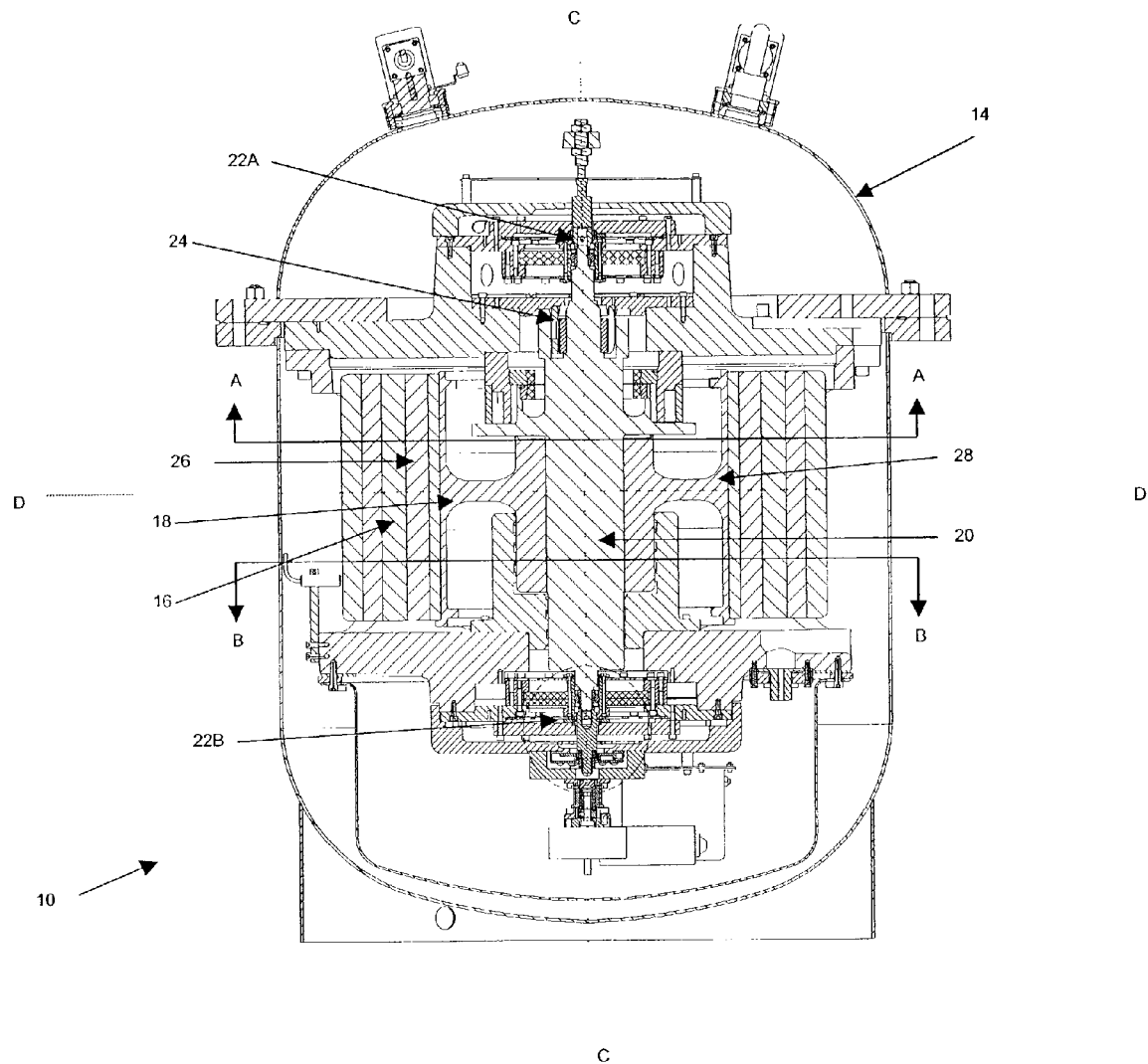
FIG. 1 is a schematic cut away view of a conventional flywheel evacuated energy storage system ("FESS")

Implementation of this system 110 allows for operation of the FESS with assurance that if a crash/failure of one or more of its components occurs, the FESS itself will not fail before the crash/failure can be detected and before the FESS system can be safely stopped. This, in turn, allows the FESS to be operated at more productive levels than conventional flywheel systems (e.g., the system 10 depicted in FIGS. 1, 1A and 1B) that are operated at sub-optimal levels to entirely avoid or minimize the occurrence of crashes/failures, which may or may not have occurred if the systems were operated at more productive levels.

Most of the design features of the FESS 110 of the present invention are similar to those of a conventional FESS 10, as generally described in U.S. Pat. No. 6,347,925 ("the '925 patent), the content and teachings of which are expressly incorporated by reference in its entirely herein.

An FESS 110 of the present invention includes a flywheel assembly located within a housing 114, both of which generally are made of materials known in the art, and which can have a variety of acceptable sizes and shapes, such as those discussed in the '925 patent. The flywheel assembly of the FESS 110 generally includes the components of a conventional FESS, namely, a shaft 120, bearings 122 (e.g., one or more top bearings 122A and one or more bottom bearings 122B), a rim 116, a hub 118, a motor 124, a flywheel 126, and a rotor 128. It is understood, however, that a flywheel system 110 in accordance with the present invention need not include all of these components.

The components of the FESS 110 operate and interrelate as is generally known in the art, and as discussed in and/or taught by the '925 patent unless otherwise indicated herein. Moreover, the components have shapes, dimensions, and measurements that also are generally known to the ordinarily skilled artisan (as exemplified by the '925 patent), except as explicitly specified herein.

In accordance with systems of the present invention, an exemplary FESS 110 is designed such that it is failure resistant, but also such that in the unlikely event that a failure of one or more of the components of the FESS occurs, the design of the FESS allows that failure to be managed effectively (i.e., without the flywheel assembly breaking apart into pieces).

In an exemplary embodiment of the present invention, the FESS 110 is designed to include one or more structural barriers 130 (e.g., plates) that are strategically placed at/within areas of the FESS such that components (e.g., the rotor 128, and the motor 124) that fail, crash, or become loosened are incapable of, or at least inhibited from releasing energy rapidly enough to threaten the structural integrity of the FESS, and, in particular, of the rim 116.

Figure 1A:
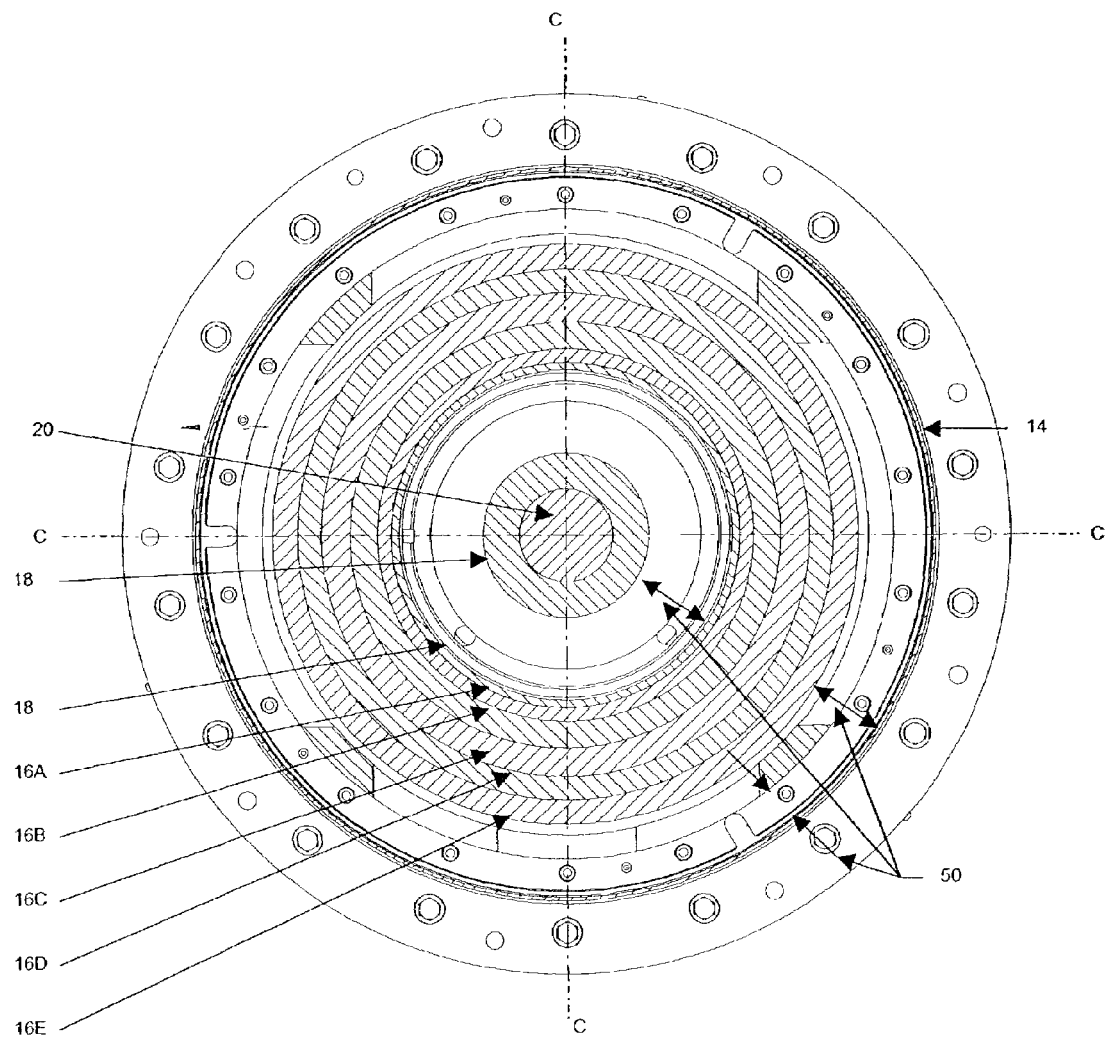
FIG. 1A is a cross sectional view of the FESS of FIG. 1 along the line A—A.
Figure 1B:
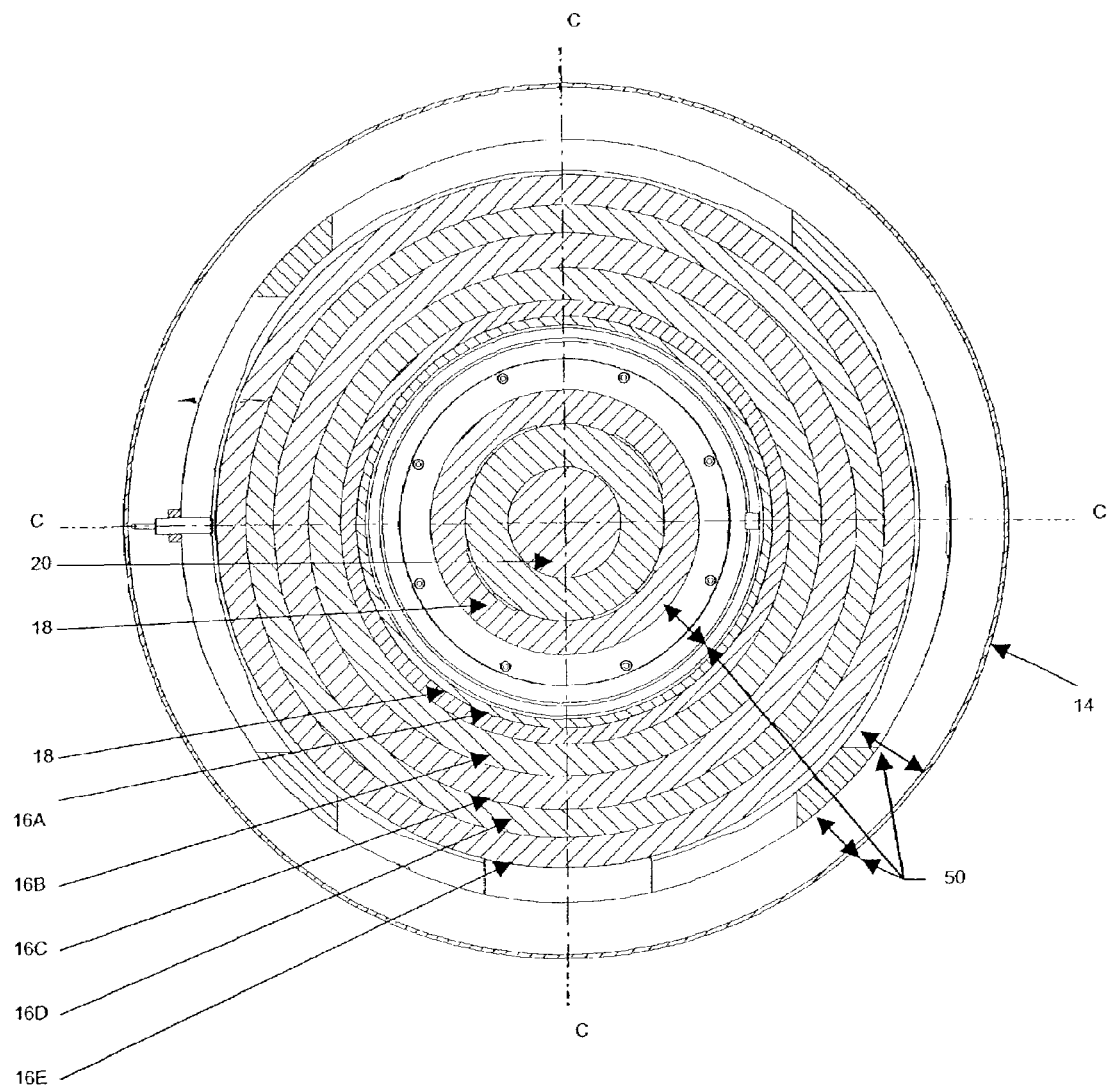
FIG. 1B is a cross sectional view of the FESS of FIG. 1 along the line B—B.

Preferably, the plate(s) 130 are positioned within areas of the FESS that traditionally are empty gaps 50 in conventional FESS's. These gaps 50 are shown in FIGS. 1A and 1B. For example, in an exemplary embodiment of the present invention, the FESS includes three plates 130—a top plate 130A, a bottom plate 130B, and a safety plate 130C, each of which is depicted in FIGS. 2, 2A and 2B.

As shown in FIG. 2A, the top plate 130A is positioned within the FESS 110 in an area that, but for the presence thereof, would define a large empty gap (see FIG. 1A). The top plate 130A thus acts as a barrier for any components in the vicinity that may have fractured or loosened. Whereas such components were able to bounce around (i.e., were physically unabated) within one of the gaps 50 of a conventional FESS 110, the size of this gap has been dramatically reduced by the presence of the top plate 130A, thus inhibiting the movement of failed components and providing a direct load path to the outer housing 114. And because the failed components cannot freely move, they cannot acquire enough momentum to cause further damage (such as rim burst) to the FESS 110.

As shown in FIG. 2B, the bottom plate 130B serves the same role for the bottom of the FESS—that is, it also is strategically placed in an area that, in a conventional FESS 10, is defined as a gap 50 in order to further provide the present FESS 110 with failure/crash management capabilities in the event of failed components in its vicinity.

The safety plate 130C also provides similar crash/failure management features, but provides such protective features in an axial direction as opposed to the protection provided by the top and bottom plates 130A, 130B in the radial direction. Additionally, this plate 130C provides a platform for the rotor 128 to safely dissipate rotational energy.

If, for example, the rotor 128 of the FESS 110 failed or became loosened, the top, bottom and safety plates 130A, 130B, 130C would control the movement of the rotor such that the rotor would not accumulate enough radial momentum to either cause damage to other components or to cause rim burst, and, therefore, will not disrupt operation of the FESS before the rotor failure condition is able to be detected. For example, as shown in FIGS. 2, 2A and 2B, a failed or loosed rotor 128 is, in essence, captured in the radial direction within a small area between the outer diameter of the shaft 120 and the inner diameter of the bottom plate 130B, and in the axial direction by the safety plate 130C.

Similarly, a failed or loosened rotor 128 is controlled primarily by the hub 118 to top/bottom plate 130A/130B contact diameters in the radial direction, and by the presence of the safety plate 130C, which limits the drop distance of the rotor in the axial direction. Both such protection systems substantially inhibiting the ability of the failed/loosened rotor 128 to develop large accelerations from uncontrolled rebounds as would occur if the rotor was able to move substantially from its pre-failure position.

The specific shape of each barrier 130 may vary; however, the shape should be chosen so as to ensure (or to at least increase the likelihood) that any components of the system that impact the plate(s) will rub against but not adhere to (i.e., not grab onto) the periphery of the plate(s). The rubbing action is effective to reduce the energy or velocity of a loosened/failed component, which, if it instead adhered to the plate(s), could cause an upset condition that would expedite a failure or crash of the system 110.

In an exemplary aspect of the present invention, each plate/barrier 130 is shaped to be or to resemble a cylindrical member.

The plates/barriers 130A, 130B, 130C can be secured in their respective positions within the FESS 110 by various connection/attachment devices including, but not limited to, screws, or by methods such as welding or shrink fitting. Generally, in accordance with the present invention, the top and bottom plates 130A, 130B are secured in their respective positions by screws, and the safety plate 130C is secured in its position by being shrink fit or tack welded.

Each of the top, bottom and safety plates 130A, 130B, 130C is generally metal-based. Exemplary materials from which each plate 130A, 130B, 130C may made include, but are not limited to, entirely or partially aluminum-based materials. Exemplary aluminum-based material include A356 compounds (e.g., A356.0-T61) and Aluminum 6061-T651 (both of which are commercially available from many suppliers, such as TST Inc. of Fontana, Calif. USA), with the top and bottom plate 130A, 130B preferably being made from A356, and the safety plate 130C preferably being made from Aluminum 6061-T651.

Each plate 130A, 130B, 130C also may have a variety of dimensions; however, the top plate and bottom plate 130A, 130B generally have substantially identical inner diameters, outer diameters and average thicknesses, but slightly different average heights. In an exemplary embodiment of the present invention that is applicable (at present) to a 6 kWh flywheel system 110, the top and bottom plate 130A, 130B have inner diameters in the range of about 5 inches to 8 inches (preferably about 6 inches), outer diameters in the range of about 20 inches to 25 inches (preferably about 23 inches), and average thicknesses in the range of about 0.5 inch to 1.0 inch (preferably about 0.8 inch). For a 6 kWh flywheel system 110, the top plate 130A generally has an average height in the range of about 3 inches to 8 inches (preferably about 5 inches), and the bottom plate 130B has an average height in the range of about 5 inches to 10 inches (preferably about 8 inches).

For a 6 kWh flywheel system, the safety plate 130C generally has an inner diameter in the range of about 8 inches to 13 inches (preferably 10.5 inches), an outer diameter in the range of about 16 inches to 23 inches (preferably about 20 inches), an average thickness and average height, each of which is in the range of about 0.7 inch to 1.2 inch, and each of which is preferably about 1.0 inch.

Additional crash/failure management protection for the FESS 110 is provided by setting certain tolerances during FESS assembly. Some exemplary tolerances include, but are not limited to, providing clearances within various areas of the FESS, wherein such clearances are in either or both the axial and radial directions.

Exemplary radial clearance assembly tolerances can include, but are not limited to, providing a radial clearance (a) between drag pump threads 140 located on the bottom plate cylindrical extension 142 and the outer surface 144 of the shaft 120, and/or (b) between the inner surfaces of the hub balance ring 146 and the outer surfaces of the top plate cylindrical extensions 148 and bottom plate cylindrical extensions 142, wherein the radial clearance is less than the radial clearance between the outer surface of the rim 116 and the inner surface of the vacuum housing 152, and/or (c) between the shaft outer surface 144 and the inner surface of the through-hole located in the upper damper base housing 154, and/or (d) between the shaft rotating magnet outer surface 156 and the inner surface of the stationary magnet 158.

Exemplary axial assembly tolerances may include, but are not limited to, providing axial clearance (a) between the bottom plate 130B and the hub inner cylinder bottom edge 160, and/or (b) between the lower shaft shoulder 162 and lower damper assembly top surface 164, and/or (c) between the top surface of the rotating magnet housing 166 at the upper end of the shaft and the bottom surface of the top plate 130A, and/or (d) between the base of the hub 118 and rim 116 and the top surface of the safety plate 130C (wherein this axial clearance is equal to between about one-third and one-half of the hub web thickness), and/or (e) between the outer axial and radial surfaces of the top bearing cap 168 and bottom bearing cap 170 and the top damper top cover and lower damper base plate (i.e., earthquake stops).

The systems and methods of the present invention are applicable to a wide range of flywheel systems, including those that have single or multi-layered rims. Referring again to FIGS. 1, 1A and 1B, the design of conventional flywheel systems 10 is such that their rim 16 may be the first FESS component to fail. Because the rim 16 encloses the hub 18 and can act to guide the rotor 28 if the shaft 20 fails, should the rim fail or undergo rim burst and the FESS continues spinning, the other barrier-less flywheel components will likely be almost immediately jettisoned from the flywheel assembly and into the flywheel housing 14.

As manufactured, conventional composite-based rims include so-called "life limiting points," which are areas of the rim that are susceptible to crack formation during operation of the flywheel system. Examples of life-limiting points include, but are not limited to, voids formed by encapsulated air, and non-uniform shaped areas of the rim. The existence of life-limiting points within the rim is generally accepted as an inevitable consequence of cost-efficient composite-based rim formation.

During spinning of the flywheel 26, high levels of tension stress are created in the rim 16 by body forces. The other components (e.g., the hub 18) of the flywheel system 10 further add to, and/or magnify the effects of these stresses.

Therefore, if a conventional FESS 10 is spun too fast (i.e., enters an over-speed condition), its composite-based rim 16 will fail in an over stress condition due to rapid crack formation and propagation (i.e., single cycle fatigue) at or near one or more of the life limiting points. And even if the FESS 10 is spun at a somewhat slower speed, the rim 16 will still be subjected to cyclic stresses, which may ultimately cause cracks to form at these life-limiting points, and then to propagate due to low cycle fatigue, eventually causing the composite rim to burst.

This problem is known in the art, but is dealt with by spinning conventional flywheels 10 at low enough speeds to entirely avoid, or at least drastically delay the onset of stresses of the magnitude that would cause crack formation and propagation within the useful design life of the flywheel system. As noted above, however, this necessarily results in flywheel systems 10 that store less kinetic energy than is ideal, let alone as is possible.

Thus, in accordance with an exemplary embodiment of the present invention, an FESS 110 of the present invention includes a rim 116 designed such that it accommodates crack formation/propagation (and, therefore, failure)—even if the system is being spun at high speeds—that results from the likely presence of one or more estimated/maximum detectable size life-limiting points, the location of which may or may not be known.

Such a composite-based rim 116 is described in detail in co-pending U.S. patent application Ser. Nos. 09/952,151 and 09/952,283, each of which is entitled "COMPOSITE FLYWHEEL RIM WITH CO-MINGLED FIBER LAYERS AND METHODS FOR MANUFACTURING SAME," and each of which was filed on Sep. 13, 2001.

A brief description of the rim 116, with particular attention to its role in the crash management system of the present invention, is included below.

The rim 116 is formed from a series of tailored, co-mingled fiber-based layers, each of which is spun or wound atop another layer. FIGS. 2, 2A and 2B depict a rim 116 that includes four layers (116A, 116B, 116C, 116D), but the number of layers can vary. The rim layers 116A–116D are "tailored" in that the exact fiber content of each layer is selected such that the layer has a particular strength depending on its proximity to the inner diameter and outer diameter of the rim.

Preferably, the layer 116D that forms the outermost diameter of the rim 116 are comprised mostly, if not entirely of at least one "high" strength and/or stiffness fiber, while the layer 116A that forms the innermost diameter of the rim contain mostly, if not entirely of at least one "low" strength and/or stiffness fiber. The layer(s) 116B, 116C between the outermost 116D and innermost 116A layers generally include non-nominal amounts (i.e., volume percentages) of both "low" and "high" strength and/or stiffness fiber(s).

In an exemplary embodiment of the present invention, the rim 116 is multi-layered, wherein it is comprised of a plurality of fiber-based layers (e.g., four or five layers), wherein at least some of the layers 116A–116D include one or more low strength fiber(s) and one or more high strength fiber(s) and wherein the strength and/or stiffness of the rim increases from the innermost layer of the rim to the outermost layer of the rim.

A rim 116 designed as such will be highly resistant to crack formation. If, however, a crack does form in the rim 116, it will likely form in the first layer 116A (i.e., the comparatively weakest of the four/five layers of the rim) and will be inhibited from propagating into the second layer 116B, which is stronger than the first layer and, thus, is more resistant to crack formation/propagation. And if a crack does propagate into the second layer 116B of the rim 116, it will be inhibited from propagating into the stronger third layer 116C, and from the third layer to the still stronger fourth layer 116D.

Therefore, the multiple, co-mingled layer rim 116 of this embodiment of the present invention represents a design philosophy that not only deters crack formation in the rim, but, by virtue of the tailored compositions of the layers, causes cracks (if any are formed at all) to be initially formed in the first layer 116A, and severely inhibits the ability of such cracks to propagate into subsequent layers 116B, 116C, 116D of the rim.

This, in turn, allows the FESS 110 to be confidently operated at high speeds without fear of adverse effects (i.e., rim failure/delamination) resulting from the presence of life limiting points in the rim 116, but without rendering the rim cost-prohibitive to manufacture due to the rim being comprised entirely or too substantially of comparatively expensive "high" strength and/or stiffness fibers.

A composite rim 116 that is comprised of fiber-based layers in accordance with this exemplary embodiment of the present invention not only is effective to protect against crack formation/propagation due to naturally occurring stresses at life limiting points, it also allows the rim to resist failure if the hub 118 fails, which is a condition that generally causes failure of conventional flywheel rims.

If the hub 118 of the FESS 110 fails, a structural discontinuity to the shaft 120 is created. This condition puts a great deal of pressure on the rim 116, which, in its normal condition, is typically shrunk fit onto the hub 118, thus producing an interference fit wherein the hub is under compression, and wherein some of this compression switches to tension upon spinning of the FESS 110. If/when the hub 118 fails, most, if not all of this compression is immediately removed, and immediately transferred to the rim 116 as tension.

In a conventional FESS 10, such a condition generally would result in almost immediate rim 16 failure before the condition could be realized and, therefore, before the FESS could be safely halted. Thus, the conventional FESS 10 would undergo violent failure, where its components would be jettisoned into the flywheel housing 14.

In accordance with this exemplary embodiment of the present invention, however, the layering of the rim 116 is likely effective to safely tolerate a hub 118 failure. Specifically, the presence of multiple rim layers 116A–116D, wherein the layers have increased strength from the innermost layer 116A to the outermost layer 116D, is effective to delay the failure of the rim 116 for a long enough period of time for the hub 118 failure to be detected, and for the FESS 110 to be shut down before the rim fails, thus preventing a violent failure of the entire system where components would be strewn from the flywheel assembly and into the flywheel housing 114.

In yet another exemplary embodiment of the present invention, and in order to ensure that the FESS 110 can be shut down quickly in the event of a failure and/or crash, the FESS can include sensors (not shown) that are effective to sense conditions that, if continued for a prolonged period of time, would compromise the structural integrity of the rim 116. Upon sensing these conditions, the sensor operating system (not shown) would cause discontinuation of the supply of power to the flywheel system 110, thus causing the flywheel system to gradually decelerate to a stop.

The rim 116 will likely remain intact for a long enough period of time following the cessation of power to the FESS to ensure that the FESS would slow to a complete stop without the rim failing, regardless of which and how many components failed before the level controls sensed the failure(s).

As noted above, the crash/failure management system of the present invention seeks to manage crashes/failures of FESS components in the unlikely event that such failure(s) happen to occur.

The crash management system, when implemented, will not only be effective to safely manage crashes and failures, but, because of its design (i.e., the inclusion of the plate(s) 130 and/or the tailoring of the rim 116) and the above-indicated assembly tolerances, will control the order of component failure—that is, will force the components, if they fail, to fail in an order that causes the least amount of discord to operation of the FESS 110.

A preferable sequence of component failures is for the bearings 122, motor 124 and magnets 156, 158 to fail first, then, after a non-nominal delay, for the shaft 120 to fail, followed by the innermost layer of the rim 116A, the hub balance rings 176, the hub 118, and, lastly, the remaining layers of the rim, in order from the second layer 116B, to the third payer 116C, to the outermost layer 116D. More preferably, the failure of some of these components will be detected (e.g., via one or more sensors) such that the power to the FESS 110 can be discontinued and the FESS can gradually stop spinning before failure of the rim 116 can occur.

Although a number of embodiments of the invention have been described herein, it should be obvious to those of ordinary skill in the art that other embodiments to and/or modifications, combinations, and substitutions of the present invention are possible, all of which are within the scope and spirit of the disclosed invention.

What is claimed is:

1. A system for managing a crash or failure of a flywheel energy storage system (FESS), the FESS including a plurality of predetermined components, each of which has a predetermined location prior to the onset of a crash or failure of the FESS, the crash management system including at least one fixed structural barrier placed at a predetermined position within the FESS;
   wherein the plurality of predetermined components defines a plurality of gaps therebetween, the gaps characterized at least in part by an axial dimension and a radial dimension without the crash management system in place; and
   wherein the at least one fixed structural barrier is disposed within the FESS such that the radial dimension of one gap is reduced such that in the event of a crash or failure of the FESS, the reduced radial dimension is effective to impede further movement of at least one of the plurality of components from its predetermined location so as to avoid a catastrophic failure of at least a flywheel portion of the FESS.

2. The crash management system of claim 1, wherein the at least one fixed structural barrier comprises a first fixed structural barrier that reduces the radial dimension of one gap and a second fixed structural barrier that reduces the axial dimension of one gap.

3. The crash management system of claim 2, wherein the at least one fixed structural barrier comprises a third fixed structural barrier that reduces the radial dimension of one gap.

4. The crash management system of claim 2, wherein the reduced axial dimension is such as to impede further movement of the at least one of the plurality of components while maintaining spinning movement of a flywheel of the FESS until shutdown.

5. The crash management system of claim 1, wherein the at least one fixed structural barrier comprises two fixed structural barriers that reduce the radial dimension of one gap.

6. The crash management system of claim 1, wherein the at least one fixed structural barrier is made of a metal-based material.

7. The crash management system of claim 3, wherein the at least one fixed structural barrier is made of an aluminum-based material.

8. The crash management system of claim 1, wherein the predetermined components include predetermined flywheel components including:
   a rim;
   a shaft; and
   a hub that secures the rim to the shaft.

9. The crash management system of claim 8, wherein the FESS further comprises a motor that drives the shaft, wherein the predetermined flywheel components and the at least one fixed structural barrier are configured and arranged such that the motor will undergo a structural failure prior to a structural failure of the rim, and prior to a structural failure of the shaft, and prior to a structural failure of the hub.

10. The system of claim 8, wherein the rim includes a plurality of layers.

11. The crash management system of claim 1, wherein the reduced radial dimension is such as to impede further movement of the at least one of the plurality of components while maintaining spinning movement of a flywheel of the FESS until shutdown.

12. The crash management system of claim 1, wherein the at least one structural barrier is configured and arranged so as to prevent a grabbing action by a rotating component of the FESS impacting against the at least one structural barrier during a crash or failure of the FESS.

13. A crash management system for minimizing the consequences of a crash or failure of at least one component of a flywheel energy storage system (FESS), wherein the FESS includes at least a flywheel having a predetermined location prior to the onset of a crash or failure of the FESS, and wherein the crash management system comprises:
   at least one fixed structural barrier disposed within the flywheel system, wherein the fixed structural barrier is configured and positioned within the FESS such that, following a crash or failure of at least one of the at least one component of the FESS, change in movement of the flywheel from its predetermined location is restricted to less than a predetermined value in a radial direction, the radial direction being with respect to a long axis of a shaft to which the flywheel is mounted, the predetermined value being established so as to prevent a catastrophic failure of the flywheel following the crash or failure of the at least one component.

14. The crash management system of claim 13, wherein the at least one fixed structural barrier comprises a first fixed structural barrier that restricts movement of the flywheel in the radial direction, and a second fixed structural barrier that restricts movement of the flywheel in the axial direction.

15. The crash management system of claim 14, wherein the at least one fixed structural barrier comprises a third fixed structural barrier that restricts movement of the flywheel in the radial direction.

16. The crash management system of claim 13, wherein the predetermined value also is set to maintain spinning movement of the flywheel until shutdown of the FESS.

17. The crash management system of claim 13, wherein the at least one structural barrier is configured and arranged so as to prevent a grabbing action by the flywheel impacting against the at least one structural barrier during a crash or failure.

18. The crash management system of claim 13, wherein the at least one fixed structural barrier comprises two fixed structural barriers that restrict movement of the flywheel in the radial direction.

19. A method of managing a crash or failure of a flywheel energy storage system (FESS), the FESS including a plurality of predetermined components, each of which has a predetermined location prior to the onset of a crash or failure of the FESS, wherein the plurality of predetermined components defines a plurality of gaps therebetween, the gaps characterized at least in part by an axial dimension and a radial dimension, the method comprising the step of:
placing at least one fixed structural barrier at a predetermined position within the FESS such that the radial dimension of one gap is reduced such that in the event of a crash or failure of the FESS, the reduced radial dimension is effective to impede further movement of at least one of the plurality of components from its predetermined location so as to avoid a catastrophic failure of at least a flywheel portion of the FESS.

20. The method of claim 19, wherein the at least one fixed structural barrier comprises a first fixed structural barrier that reduces the radial dimension of one gap and a second fixed structural barrier that reduces the axial dimension of one gap.

21. The method of claim 20, wherein the at least one fixed structural barrier comprises a third fixed structural barrier that reduces the radial dimension of one gap.

22. The method of claim 19, wherein the at least one fixed structural barrier comprises two fixed structural barriers that reduce the radial dimension of one gap.

23. The method of claim 19, wherein:
(a) the predetermined components includes predetermined flywheel components including a rim, a shaft, and a hub that secures the rim to the shaft;
(b) wherein the FESS further includes a motor that drives the shaft; and wherein the method further comprises the step of:
configuring and arranging the predetermined flywheel components and the structural barriers such that the motor will undergo a structural failure prior to a structural failure of the rim, and prior to a structural failure of the shaft, and prior to a structural failure of the hub.

24. The method of claim 23, wherein the rim includes a plurality of layers.

25. The method of claim 19, wherein the at least one structural barrier is placed such that the reduced radial dimension is such as to impede further movement of the at least one of the plurality of components while maintaining spinning movement of a flywheel of the FESS to shutdown.

26. The method of claim 16, further comprising the step of: configuring and arranging the at least one structural barrier so as to prevent a grabbing action between a rotating component of the FESS impacting against the at least one structural barrier during a crash or failure of the FESS.

27. A flywheel energy storage system (FESS), the FESS comprising:
a flywheel assembly including a flywheel and a plurality of components, wherein each of the flywheel and the plurality of components has a respective predetermined location prior to the onset of a crash or failure of the FESS; and
a crash management system for minimizing the consequences of a crash or failure of at least one of the plurality of components of the flywheel assembly, wherein the crash management system includes:
at least one fixed structural barrier disposed within the FESS, wherein the fixed structural barrier is configured and positioned within the FESS such that, following a crash or failure of at least one of the at least one component of the FESS or the flywheel assembly, change in movement of the flywheel from its predetermined location is restricted to less than a predetermined value in a radial direction, the radial direction being with respect to a long axis of a shaft to which the flywheel is mounted, the predetermined value being established so as to prevent a catastrophic failure of the flywheel following the crash or failure of the FESS.

28. The FESS of claim 27, wherein the predetermined value also is set to maintain spinning movement of the flywheel until shutdown of the FESS.

29. The FESS of claim 27, wherein the structural barriers are configured and arranged so as to prevent a grabbing action by the flywheel impacting against the structural barriers during a crash or failure.

30. The FESS of claim 27, wherein the at least one fixed structural barrier comprises a first fixed structural barrier that restricts movement of the flywheel in the radial direction, and a second fixed structural barrier that restricts movement of the flywheel in the axial direction.

31. The FESS of claim 30, wherein the at least one fixed structural barrier comprises a third fixed structural barrier that restricts movement of the flywheel in the radial direction.

32. The FESS of claim 27, wherein the at least one fixed structural barrier comprises two fixed structural barriers that restrict movement of the flywheel in the radial direction.

* * * * *